(12) United States Patent
Sittnick

(10) Patent No.: US 8,602,506 B2
(45) Date of Patent: Dec. 10, 2013

(54) AIR BRAKE LOCKING DEVICE AND SYSTEM

(76) Inventor: Frank Sittnick, Orlando, FL (US)

( * ) Notice: Subject to any disclaimer, the term of this patent is extended or adjusted under 35 U.S.C. 154(b) by 227 days.

(21) Appl. No.: 13/249,540

(22) Filed: Sep. 30, 2011

(65) Prior Publication Data

US 2013/0082515 A1    Apr. 4, 2013

(51) Int. Cl.
*B60R 25/08* (2013.01)

(52) U.S. Cl.
USPC ............... 303/89; 303/7; 303/9.76; 303/50; 303/71; 303/123; 137/234.6; 137/384.6; 137/556; 137/598; 137/627.5; 137/637.1; 137/865; 188/181 A; 188/265; 188/353

(58) Field of Classification Search
USPC ............. 303/7, 66, 67, 29, 89; 251/366, 309; 137/234.6, 312; 188/286; 138/125, 126
See application file for complete search history.

(56) References Cited

U.S. PATENT DOCUMENTS

| 3,004,421 | A | | 3/1960 | Bowler | |
|---|---|---|---|---|---|
| 4,163,584 | A | * | 8/1979 | Koenig | 303/7 |
| 4,543,984 | A | * | 10/1985 | Murray | 137/385 |
| 5,675,997 | A | | 10/1997 | Hulak | |
| 6,367,888 | B1 | * | 4/2002 | Kee et al. | 303/89 |
| 6,789,856 | B2 | * | 9/2004 | Bottiglieri | 303/89 |
| 8,376,472 | B1 | * | 2/2013 | Hoffer | 303/89 |
| 2004/0036350 | A1 | * | 2/2004 | Rowe et al. | 303/89 |
| 2005/0023888 | A1 | * | 2/2005 | Knight | 303/7 |

* cited by examiner

*Primary Examiner* — Robert A Siconolfi
*Assistant Examiner* — San Aung
(74) *Attorney, Agent, or Firm* — Daniel Law Offices, P.A.; Jason T. Daniel, Esq.

(57) ABSTRACT

An air brake locking device for a vehicle includes a main body having a pair of internal channels capable of connecting to a vehicle air line, a valve interposed between the internal channels for controlling the flow of air, and a control unit for regulating the operation of the valve.

13 Claims, 4 Drawing Sheets

AIR BRAKE LOCKING DEVICE AND SYSTEM

BACKGROUND

FIELD OF THE INVENTION

The present invention relates generally to theft prevention devices, and more particularly to an air brake locking device capable of disrupting the flow of air to the braking system of conventional tractors and trailers.

The trucking industry faces losses due to theft of vehicles and specifically trailers loaded with merchandise each year. The most common form of theft typically involves semi-trailers that are parked at a staging area and awaiting pick up. Upon identifying a desirable trailer, criminals will often simply back a tractor to the parked trailer, connect the air hoses and drive away.

For this reason, there has been an existing need for security systems and disabling/locking mechanisms to prevent trailer theft. Several conventional systems include U.S. Pat. No. 3,004,421 which acts to secure a cylindrical lock over the king-pin in order to prevent physical coupling of the trailer and tractor.

Another recent reference is directed to U.S. Pat. No. 5,675,997 which includes a locking device that fits over the air coupler of a trailer (often called a glad hand) and prevents unauthorized users from connecting the trailer line to the tractor.

Although these devices serve to deter the common criminal, they suffer from the problem that a determined criminal will smash bend or cut these locks, which are clearly visible, and can then gain access to the trailer without causing damage to the trailer itself. To this end, the present invention, directed to an air brake locking device and system differs from the foregoing prior art in a number of aspects. The manner by which will become more apparent in the description which follows, particularly when read in conjunction with the accompanying drawings.

SUMMARY OF THE INVENTION

The present invention is directed to an air brake locking device for a vehicle. One embodiment of the present invention can include a main body having a pair of internal channels configured to connect to a vehicle air line, a valve interposed between the internal channels, said valve being configured to control the flow of air through the internal channels, and a control unit configured to regulate the operation of the valve.

Another embodiment of the present invention can include a remote operation unit configured to allow the device to be remotely operated via a transmitter.

Yet another embodiment of the present invention can include an air brake locking system having an air brake locking device and a transmitter configured to remotely control the supply of air to a vehicle braking system.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
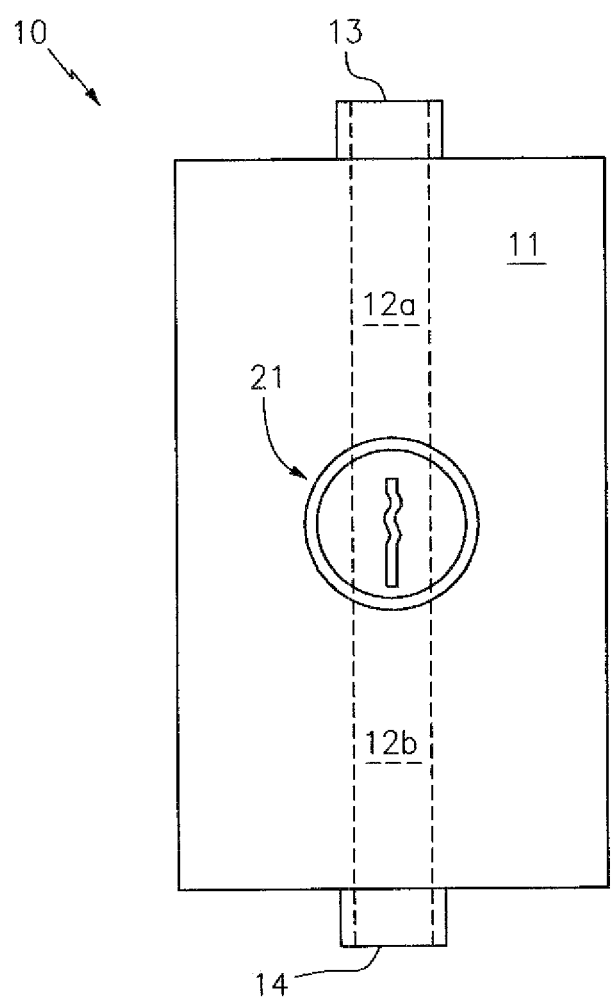
FIG. 1 is a top view of an air brake locking device that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1.

Figure 2:
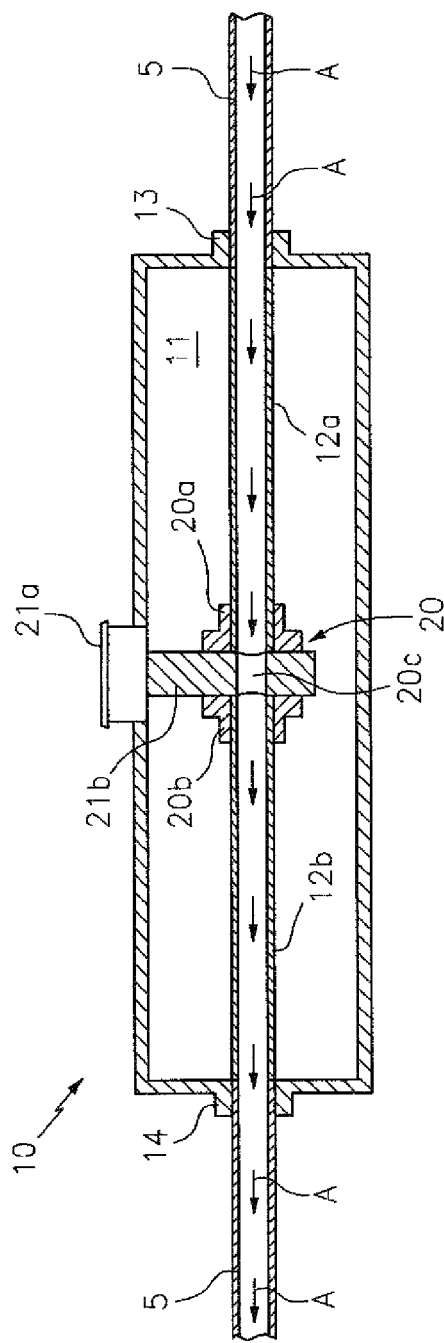
FIG. 2 is a side view of the air brake locking device in an open position, in accordance with one embodiment of the invention.
Figure 3:
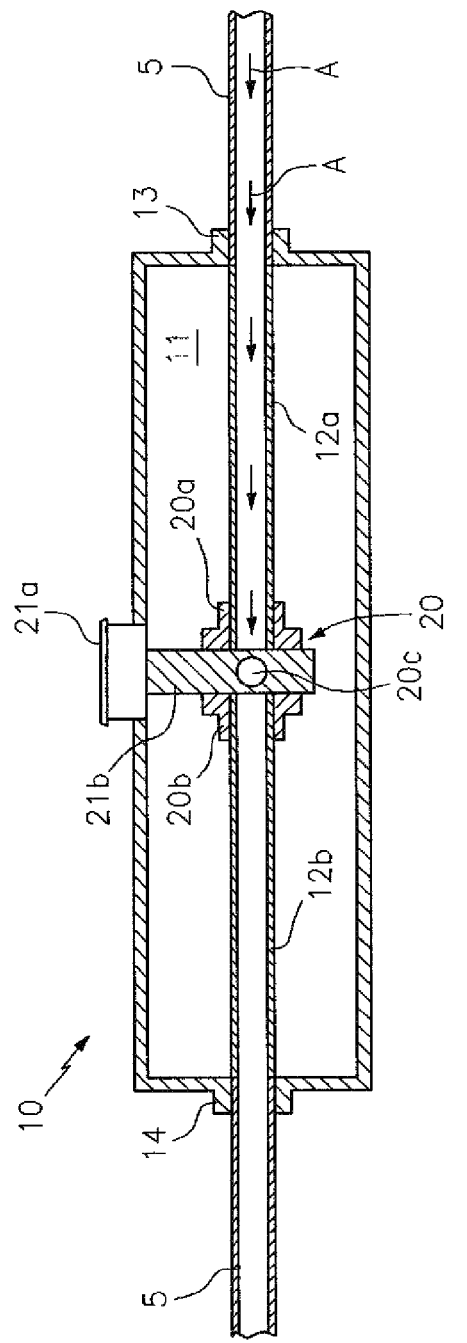
FIG. 3 is a side view of the air brake locking device in a closed position, in accordance with one embodiment of the invention.

FIGS. 1-3 illustrate one embodiment of an air brake locking device 10 that is useful for understanding the inventive concepts disclosed herein. As described in this document, the device 10 can be installed on the air brake hose(s) of a trailer and/or tractor, in order to allow a user to effectively disable the braking system of the vehicle by preventing the pressurized air from reaching the brakes.

As shown, the air brake locking device 10, according to one embodiment, can include a generally rectangular main body 11 having a pair of centrally located channels 12a and 12b, an input connector 13, an output connector 14, a valve 20 and a controller 21.

The main body 11 can act to securely position the central channel 12, the connectors 13-14, and the valve 20 in a conventional manner, so as to create a single integrated device. To this end, the main body can take any number of distinct shapes and sizes, and can be constructed from any number of known materials and methods. In one preferred embodiment, main body 11 can be constructed from a hardened material such as cast aluminum, and will include a plurality of internal fasteners (not shown) for securely positioning each of the elements 12-21. Of course, other known materials and manufacturing processes are also contemplated, such as steel and plastic, for example.

In another embodiment (not illustrated) the main body 11 can further include one or more openings through which conventional mounting hardware such as screws, bolts and the like can be placed in order to secure the device 10 to a tractor or trailer.

The central channels can act to transport air from the input connector 13 to the output connector 14. As shown, channel 12a is interposed between the input connector 13 and the valve 20, and channel 12b is interposed between the valve 20 and the output connector 14. As described herein, the central channels can include any number of known components capable of transporting pressurized air, gas or fluids through the device 10. In preferred embodiment, the central channels can be constructed from reinforced multi-layered nylon air brake tubing that are conventionally connected to the valve and connectors. However, other materials and methodologies are also contemplated. For example, in another embodiment, the central channels can be constructed by drilling through the main body material until reaching the valve 20 so as to allow the channels to become integral with the main body itself and thus not requiring additional construction materials.

The connectors 13 and 14 can act to connect the device 10 to the air line(s) 5 of a tractor trailer in a location between the glad hand and the brakes. To this end, connector 13 can be connected to the air line 5 upstream, so as to receive the air provided by the tractor, and connector 14 can be connected to the air line downstream, so as to provide the forced air to the brakes when the valve 20 is in an open position. In one preferred embodiment, each connector 13 and 14 can include conventional compression fittings, such as a double end union fitting, for example, capable of being permanently secured to both the central channel and the air line 5. Of course other known connection devices, such as tube connectors, conduit fittings, and adaptors, among other known hardware can also be utilized.

The valve 20 can act to regulate the flow of air A through the device 10 when operated by the controller 21. In one embodiment the valve can comprise a conventional in-line valve having an input side 20a that is conventionally connected to the central channel 12a, an output side 20b that is conventionally connected to the central channel 12b, and a rotatable plug 20c. The rotatable plug, as is known in the art, is positioned between the input side and the output side, and includes an opening extending through the plug in order to allow air to flow from the input to the output when the plug openings are aligned with the input and output sides of the valve. Alternatively, when the plug openings are not aligned with the input and output sides, air is prevented from passing through the valve.

The controller 21, according to one embodiment, can act to control the operation of the valve 20, and will include a lock 21a, and a rotatable shaft 21b that is connected to the plug 20c of the valve 20. In one preferred embodiment, lock 21a can include a conventional key lock configured to operate the valve when operated by a designated key. Of course other devices such as a push button lock, among others, for example are also contemplated.

In operation, when the lock 21a is operated, the shaft 21b, which is attached to the plug 20c, will manually rotate the plug from an open position (FIG. 2) in which air is allowed to flow unobstructed through the device, to a closed position (FIG. 3) in which air is prevented from flowing through the device. To this end, when the device is in an open position, pressurized air is supplied to the trailer brakes, thus allowing normal operation. However, when the device is in a closed position, air is prevented from reaching the brakes which ensures the trailer brakes will remain engaged, thus preventing the vehicle from moving.

Figure 4:
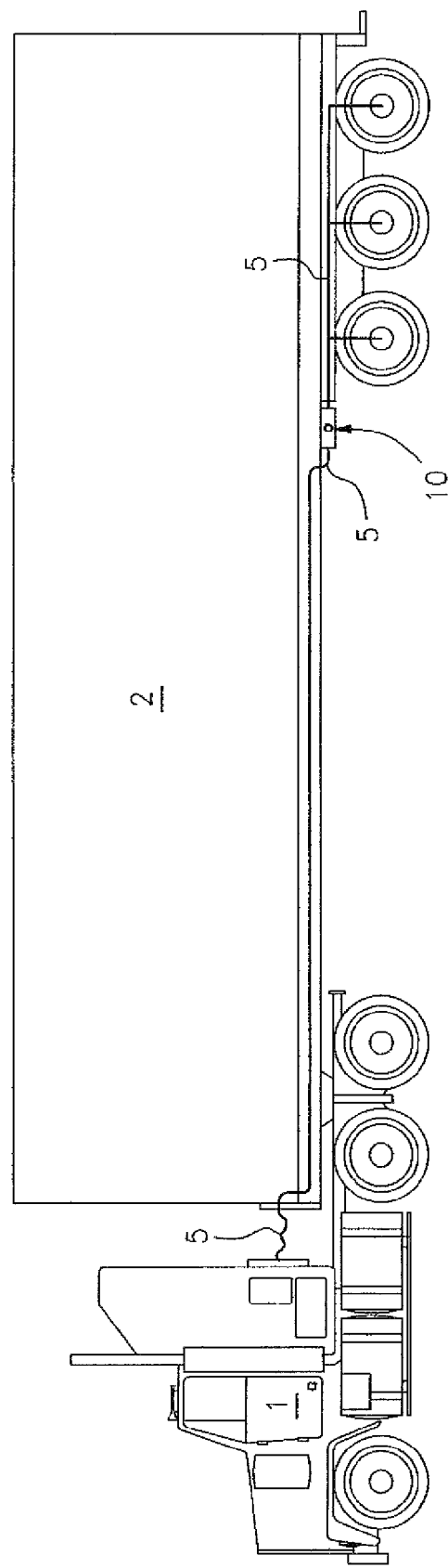
FIG. 4 is a perspective view of the air brake locking device in operation, according to one embodiment of the invention.

FIG. 4 illustrates one embodiment of the device 10 in operation. As shown, the device can be positioned virtually anywhere along the body of the trailer 2, and connected in series with the trailer brake line(s) 5 that are supplied pressurized air from the tractor 1. When installed, such a device can allow a user to easily and quickly disable vehicle brakes without the need to physically attach and remove bulky hardware in between operations of the vehicle. Moreover, owing to the small size of the device 10, the air brake locking device can be installed at any number of discreet locations which would be difficult for a would-be thief to locate.

Although described above as a means for disabling the brakes of a trailer 2, the inventive concepts described herein are not so limiting. To this end, one of skill in the art will recognize that the device 10 can also be utilized to disable the air braking system of the tractor 1 itself, as well as virtually any other air dependent vehicle or device.

Figure 5:
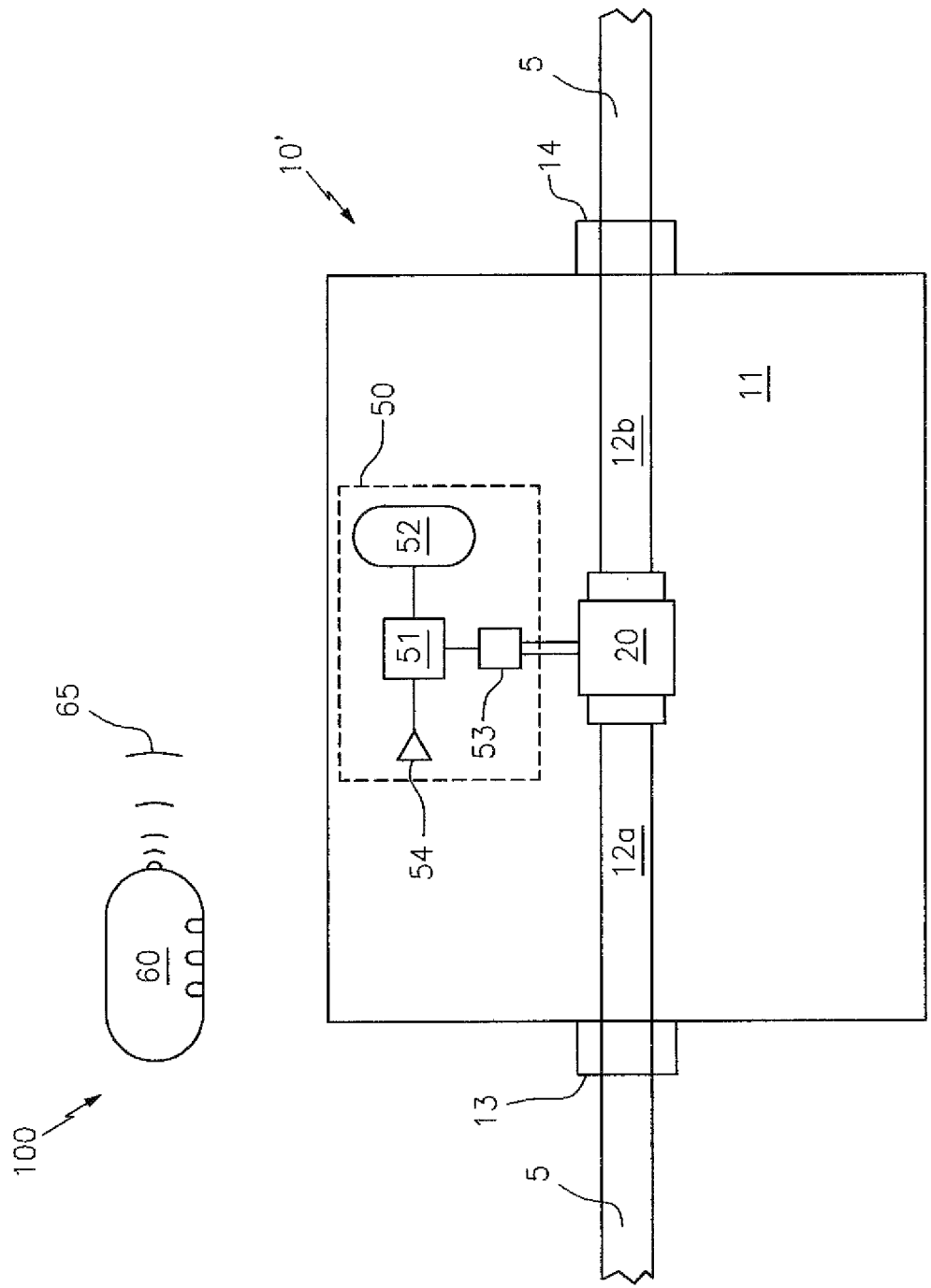
FIG. 5 is a top view of an air brake locking system utilizing the air brake locking device in accordance with an alternate embodiment of the invention.

FIG. 5 illustrates one embodiment of an air brake locking system 100 utilizing an alternate embodiment of the air brake locking device 10 described above. As shown, device 10' can further include a remote operation unit 50 capable of allowing the device to be remotely operated via a wireless transmitter 60. As shown, the remote operation unit 50 can include a processor 51 conventionally connected to a memory 52, a valve actuator 53, and a receiver 54.

The processor 51 can act to execute program code stored in the memory 52 in order to allow the device to control the flow of air through the brake line(s) to which it is attached. Processors are extremely well known in the art, therefore no further description will be provided.

Memory 52 can act to store operating instructions in the form of program code for the processor 51 to execute. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device. Additionally, memory 52 can also include one or more cache memories that provide temporary storage of at least some program code in order to reduce the number of times program code must be retrieved from the bulk storage device during execution. Each of these devices are well known in the art.

The valve actuator 53 can act to physically manipulate the valve 20 between an open and closed position when instructed by the processor. As described herein, the valve actuator 53 can include any number of known devices such as a linear actuated motor and/or solenoid mechanism, among others, for example. These items and their associated functionality are extremely well known in the art, hence no further description will be provided herein.

The receiver 54 can act to receive a wireless signal from a transmitter 60. In one preferred embodiment, the receiver can include a variable radio wave receiver having a unique radio frequency chip capable of receiving and translating a plurality of independent radio frequencies 65, which can be sent to the processor 51 and/or the memory 52.

Although described above as using radio transmission, reception and frequencies, other communication mediums and their associated components are also contemplated. For example, infrared (IR), Bluetooth, RFID, microwave, cellular and other known communication mediums can also be utilized without deviating from the scope and spirit of the inventive concepts disclosed herein. Moreover, although not illustrated, the device can be connected to the DC power source of the trailer and/or tractor to which it is attached in a conventional manner in order to provide the power necessary to operate the remote unit 50.

In one preferred embodiment, the processor 51 and/or memory 52 will include programming to prevent the device from being operated when the truck is in motion. Such a feature can protect against inadvertent operation of the transmitter.

By providing a remote operation unit, the device 10 can be installed onto the vehicle in locations that are not directly accessible. Such a feature will act to provide enhanced security against thieves looking to gain control over the vehicle.

In operation, a user can operate the remote transmitter 60 to enable/disable the air supplied to the vehicle braking system, as described above, without having to physically touch the trailer itself, or to install equipment after each use, thereby providing a novel disabling system that is quick and efficient to use.

As described herein, one or more elements of the air brake locking device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the main body 11, channels 12a and 12b, input connector 13, output connector 14 and/or control unit 20, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An air brake locking device for a vehicle, said device comprising:
    a durable main body having a plurality of sides defining an interior section, said main body being configured to be secured to the vehicle;
    an input connector positioned along a first end of the main body, said input connector being configured to connect to a vehicle air line at a first location and receive pressurized air;
    an output connector positioned along a second end of the main body, said output connector being configured to connect to the vehicle air line at a second location to deliver the pressurized air;
    a valve having an input side and an output side that is positioned within the interior section of the main body, said valve being configured to regulate a flow of the pressurized air;
    a first channel disposed within the interior section of the main body, said first channel being connected to the input connector at a first end and the input side of the valve at a second end,
    wherein said first channel is configured to deliver the pressurized air from the input connector to the valve;
    a second channel disposed within the interior section of the main body, said second channel being connected to output side of the valve at a first end and the output connector at a second end,
    wherein said second channel is configured to deliver the pressurized air from the valve to the output connector, and each of said first and second channels are constructed from reinforced layered tubing; and
    a controller configured to operate the valve.

2. The air brake locking device of claim 1, wherein each of said first and second channels are formed as a part of the main body.

3. The air brake locking device of claim 1, wherein the valve is an in-line valve.

4. The air brake locking device of claim 1, wherein the controller further includes a lock.

5. The air brake locking device of claim 4, wherein said lock includes a key lock.

6. The air brake locking device of claim 4, wherein said lock includes a push button lock.

7. The air brake locking device of claim 1, wherein said main body further includes one or more openings for allowing the device to be connected to the vehicle via conventional mounting hardware.

8. An air brake locking device for a vehicle, said device comprising:
    a durable main body having a plurality of sides defining an interior section, said main body being configured to be secured to the vehicle;
    an input connector positioned along a first end of the main body, said input connector being configured to connect to a vehicle air line at a first location and receive pressurized air;
    an output connector positioned along a second end of the main body, said output connector being configured to connect to the vehicle air line at a second location and deliver the pressurized air;
    a valve having an input side and an output side that is positioned within the interior section of the main body, said valve being configured to regulate a flow of the pressurized air;
    a first channel disposed within the interior section of the main body, said first channel being connected to the input connector at a first end and the input side of the valve at a second end,
    wherein said first channel is configured to deliver the pressurized air from the input connector to the valve;

a second channel disposed within the interior section of the main body, said second channel being connected to output side of the valve at a first end and the output connector at a second end, wherein said second channel is configured to deliver the pressurized air from the valve to the output connector, and each of said first and second channels are constructed from reinforced layered tubing; and a remote operation unit positioned within the main body, said unit including a processor, a memory, a receiver configured to receive a unique wireless signal, and a valve actuator configured to operate the valve.

9. The air brake locking device of claim 8, wherein said unique wireless signal includes at least one of a radio signal, an infrared signal, a Bluetooth signal, a microwave signal, a cellular signal and an RFID signal.

10. The air brake locking device of claim 8, wherein each of said first and second channels are formed as a part of the main body.

11. The air brake locking device of claim 8, wherein the valve is an in-line valve.

12. The air brake locking device of claim 8, wherein said main body further includes one or more openings for allowing the device to be connected to the vehicle via conventional mounting hardware.

13. An air brake locking system for a vehicle, said system comprising:

a transmitter configured to transmit a wireless signal; and an air brake locking device that includes a durable main body having a plurality of sides defining an interior section, said main body being configured to be secured to the vehicle;

an input connector positioned along a first end of the main body, said input connector being configured to connect to a vehicle air line at a first location and receive pressurized air;

an output connector positioned along a second end of the main body, said output connector being configured to connect to the vehicle air line at a second location and deliver the pressurized air;

a valve having an input side and an output side that is positioned within the interior section of the main body, said valve being configured to regulate a flow of the pressurized air;

a first channel disposed within the interior section of the main body, said first channel being connected to the input connector at a first end and the input side of the valve at a second end, wherein said first channel is configured to deliver the pressurized air from the input connector to the valve;

a second channel disposed within the interior section of the main body, said second channel being connected to output side of the valve at a first end and the output connector at a second end, wherein said second channel is configured to deliver the pressurized air from the valve to the output connector, and each of said first and second channels are constructed from reinforced layered tubing; and a remote operation unit positioned within the main body, said unit including a processor, a memory, a receiver configured to receive the unique wireless signal from the transmitter, and a valve actuator configured to operate the valve.

* * * * *